(12) United States Patent
Burghard et al.

(10) Patent No.: US 11,677,202 B2
(45) Date of Patent: Jun. 13, 2023

(54) CONTACT RING FOR HIGHLY DYNAMIC APPLICATIONS

(71) Applicant: TE Connectivity Germany GmbH, Bensheim (DE)

(72) Inventors: Michael Burghard, Bensheim (DE); Jochen Fertig, Bensheim (DE); Stefan Masak, Bensheim (DE); Hubert Pollok, Darmstadt (DE); Kevin Scheer, Bensheim (DE); Ivan Ivanov, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 17/527,556

(22) Filed: Nov. 16, 2021

(65) Prior Publication Data

US 2022/0158398 A1     May 19, 2022

(30) Foreign Application Priority Data

Nov. 19, 2020   (DE) .......................... 102020130634.2

(51) Int. Cl.
*H01R 39/64* (2006.01)
*H01R 39/02* (2006.01)
*H01R 4/26* (2006.01)

(52) U.S. Cl.
CPC .......... *H01R 39/64* (2013.01); *H01R 39/025* (2013.01); *H01R 4/26* (2013.01)

(58) Field of Classification Search
CPC . H01R 4/26; H01R 4/28; H01R 39/64; H01R 39/025
See application file for complete search history.

(56) References Cited

U.S. PATENT DOCUMENTS

| 4,426,127 | A | 1/1984 | Kubota | |
|---|---|---|---|---|
| 7,857,661 | B1 | 12/2010 | Islam | |
| 8,303,357 | B2 * | 11/2012 | Kuwahara | ................ H01R 4/26 439/444 |
| 10,103,468 | B2 * | 10/2018 | Kovalov | .................. H01R 4/26 |
| 2006/0166552 | A1 | 7/2006 | Bence et al. | |
| 2015/0024627 | A1 | 1/2015 | Wei | |
| 2016/0336661 | A1 | 11/2016 | Cala Romero et al. | |

FOREIGN PATENT DOCUMENTS

| DE | 10 2004 002 403 B3 | 7/2005 |
|---|---|---|
| EP | 0091370 A2 | 10/1983 |

OTHER PUBLICATIONS

Abstract of DE 102004002403, dated Jul. 14, 2005, 1 page.
Extended European Search Report dated Apr. 4, 2022, corres. to Application No. 21208401.6-1201, 11 pages.

* cited by examiner

*Primary Examiner* — Oscar C Jimenez
*Assistant Examiner* — Paul D Baillargeon
(74) *Attorney, Agent, or Firm* — Barley Snyder

(57) ABSTRACT

A contact ring including a ring-shaped structure formed of an electrically conductive material. The ring-shaped structure has a plurality of projections on at least one side and a plurality of blades on at least one side. The projections and the blades penetrate an electrically insulating surface layer of each of a pair of contact elements and contact an electrically conductive material of each of the contact elements to electrically connect the contact elements.

19 Claims, 7 Drawing Sheets

CONTACT RING FOR HIGHLY DYNAMIC APPLICATIONS

CROSS-REFERENCE TO RELATED APPLICATIONS

This application claims the benefit of the filing date under 35 U.S.C. § 119(a)-(d) of German Patent Application No. 102020130634.2, filed on Nov. 19, 2020.

FIELD OF THE INVENTION

The present invention relates to a contact ring which connects contact elements in an electrically conductive manner.

BACKGROUND

Contact rings are known in the form of compression spring contacts which are made of electrically conductive materials and can therefore establish electrically conductive connections between contact elements. These contact rings are typically flat and have, for example, a wave shape so that they alternately touch the surfaces of the contact elements. FIGS. 1A to 1B illustrate a conventional arrangement of two contact elements 1, 2 without a connecting member (FIG. 1A) and two contact elements 1, 2 with a connecting member 3 (FIG. 1B). The connecting member 3 in FIG. 1B is a typical contact ring as is known from prior art. The contact ring is flat and wave-shaped and is typically made of spring steel which has good mechanical but poor electrothermal properties, which can also hardly be compensated for by a thick silver plating. The contact sections of the known contact ring are also not able to reliably penetrate electrically insulating surface layers, such as aluminum oxide, with typical contact forces. They are also prone to corrosion. Contact elements 1, 2, though containing electrically conductive materials whose surfaces, however, are made of electrically insulating layers, such as natural oxides, cannot be connected in an adequate electrically conductive manner by the contact ring 3 shown in FIG. 1B.

This problem is solved by the known contact ring 4 shown in FIG. 1C. Such a contact ring 4 is formed by closing a strip 15 of an electrically conductive material, for example a silver-plated copper alloy, with a closure 16 to form a closed, ring-shaped structure. The strip 15 comprises projections 14 on at least one longitudinal side. The projections 14 have tips or sharp edges that penetrate the electrically insulating surface layers of the contact elements and thereby establish an electrically conductive connection between the electrically conductive cores of the contact elements.

However, due to the predominantly elastic mounting of the contact ring 4 according to FIG. 1C between the contact elements, the vibration resistance of this contact ring 4 is limited. This is because the entire load of the vibrations is transmitted via the projections 14. It is therefore very difficult to shape and dimension the projections 14 or other flexible structures in such a way that they can withstand the permanently high dynamic loads. A contact piece is therefore required that combines good electrothermal properties with increased vibration resistance.

SUMMARY

A contact ring including a ring-shaped structure formed of an electrically conductive material. The ring-shaped structure has a plurality of projections on at least one side and a plurality of blades on at least one side. The projections and the blades penetrate an electrically insulating surface layer of each of a pair of contact elements and contact an electrically conductive material of each of the contact elements to electrically connect the contact elements.

BRIEF DESCRIPTION OF THE DRAWINGS

The invention will now be described by way of example with reference to the accompanying Figures, of which.

DETAILED DESCRIPTION OF THE EMBODIMENT(S)

Figure 1A:
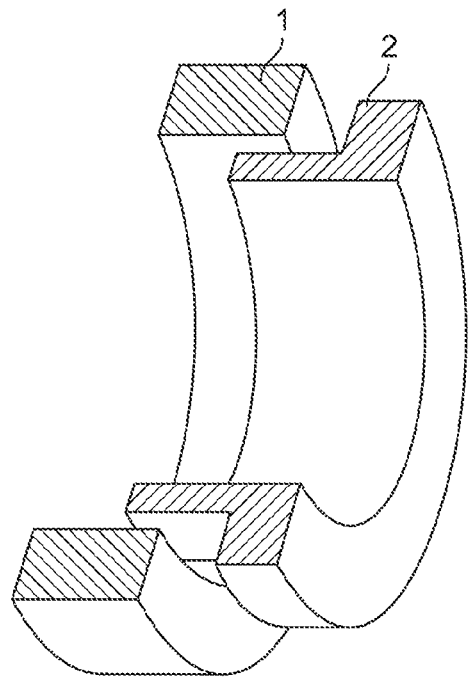
FIG. 1A is a sectional perspective view of a first contact element and a second contact element in a known embodiment.
Figure 1B:
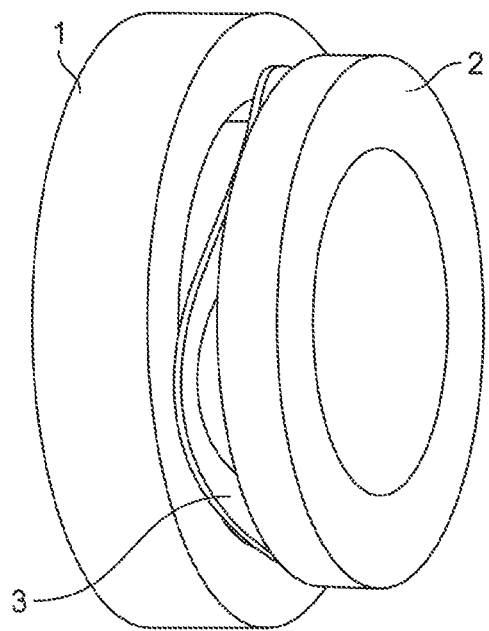
FIG. 1B is a perspective view of the first contact element and the second contact element of FIG. 1A connected by a contact ring according to a known embodiment.

For better understanding of the present invention, it shall be explained in detail below by way of the embodiments illustrated in the figures. Same elements are there designated with same reference numerals and same component designations. Furthermore, some features or combinations of features from the different embodiments shown and described can also be independent inventive solutions by themselves or solutions according to the invention.

The contact member according to the present invention has the shape of a ring or a ring-shaped disk, wherein the terms "ring", "ring-shaped disk", and "ring-shaped structure" in the present application refer to circular ring structures as well as structures that are topologically equivalent to circular ring structures. In order to ensure better understanding, only the term "ring" shall be used in the following without further specification. The figures show circular ring structures by way of example, although structures that are topologically equivalent to circular ring structures are also included.

Embodiments of the present invention shall be described hereafter in detail with reference to FIGS. 2 to 5C.

Figure 1C:
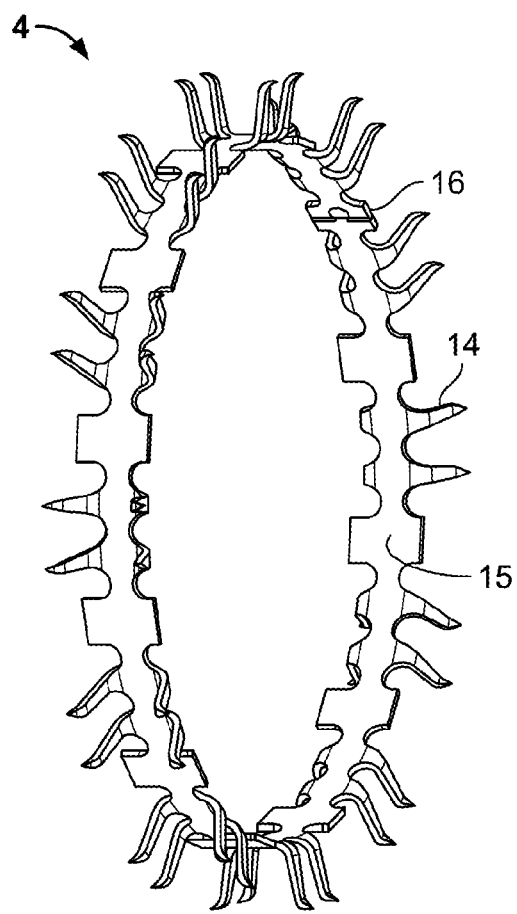
FIG. 1C is a perspective view of a contact ring according to another known embodiment.
Figure 2:
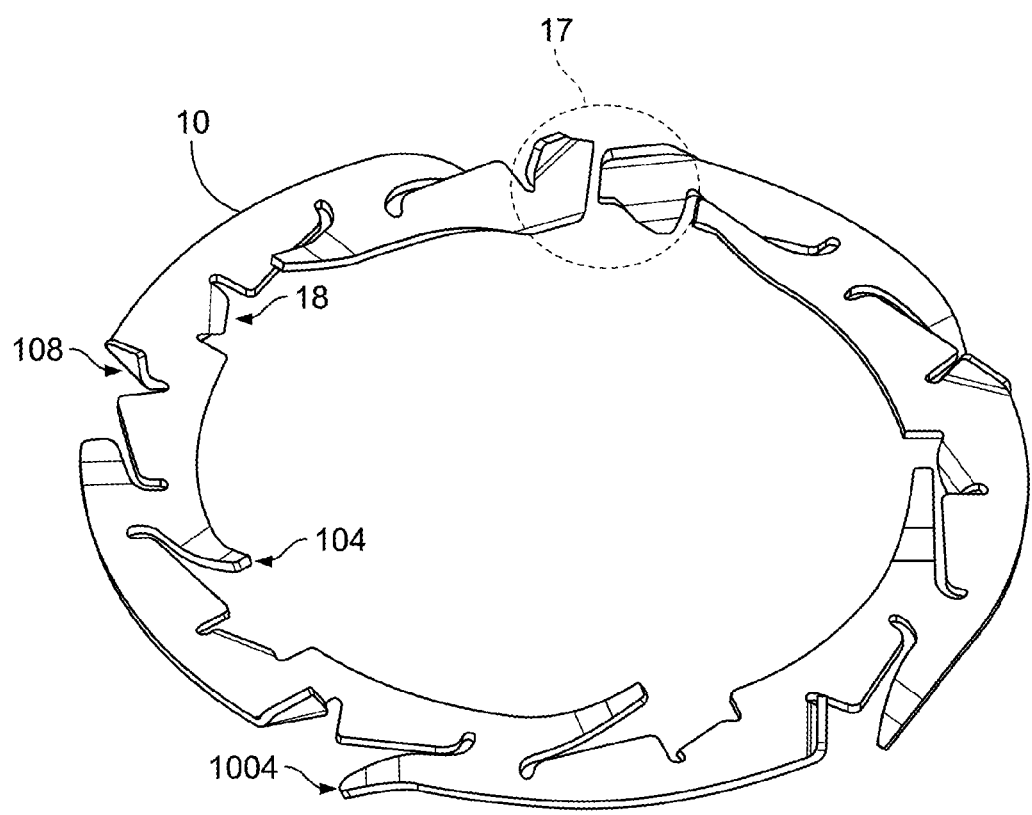
FIG. 2 is a perspective view of a contact ring according to an embodiment of the invention.
Figure 3A:
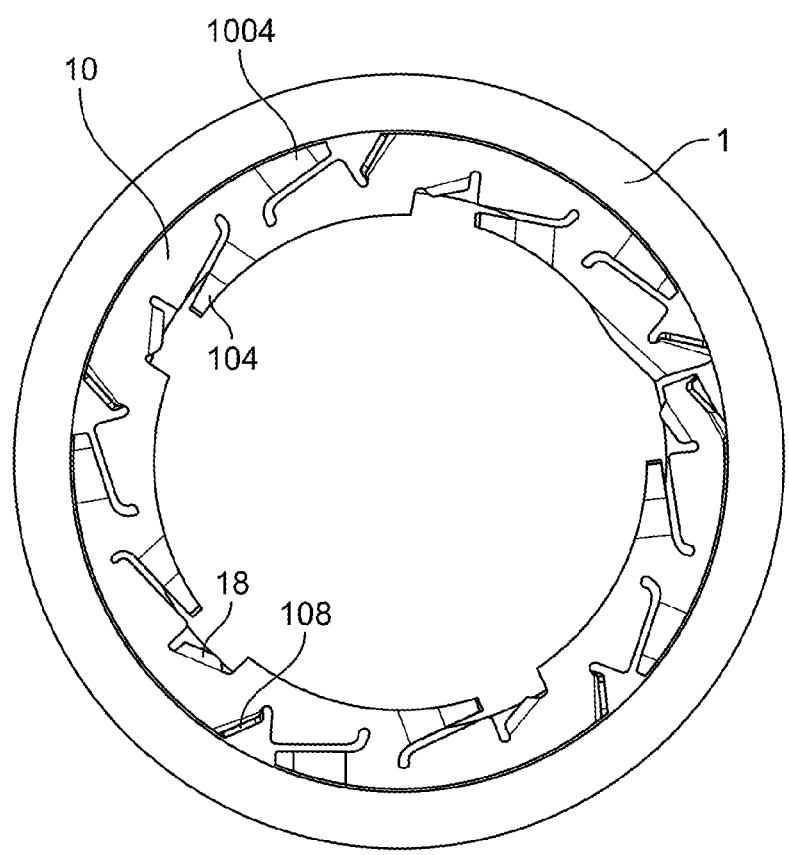
FIG. 3A is a side view of the contact ring of FIG. 2 with a contact element.
Figure 3B:
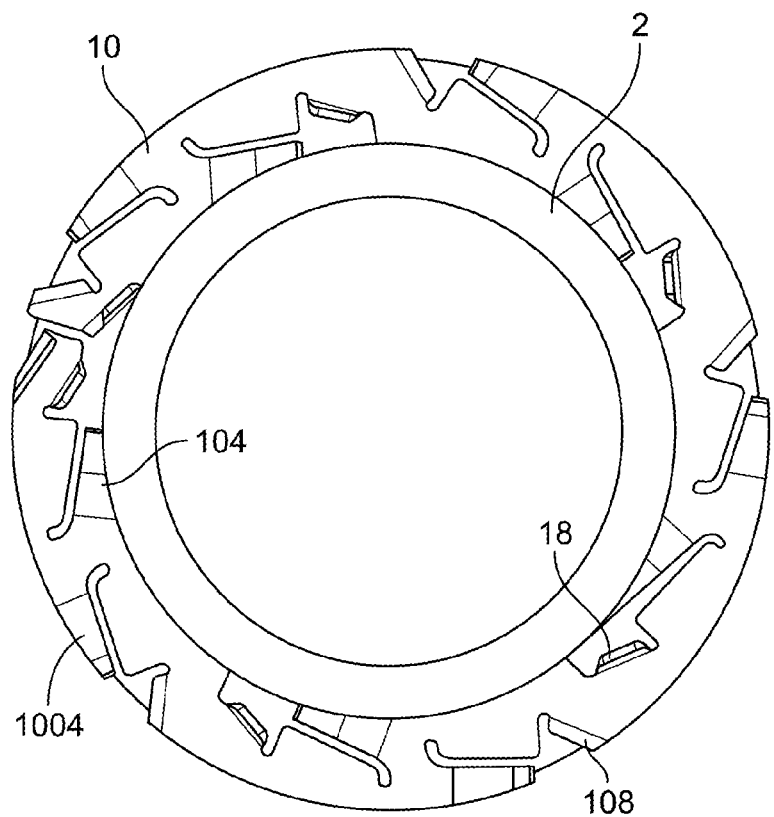
FIG. 3B is a side view of the contact ring of FIG. 2 with another contact element.
Figure 4:
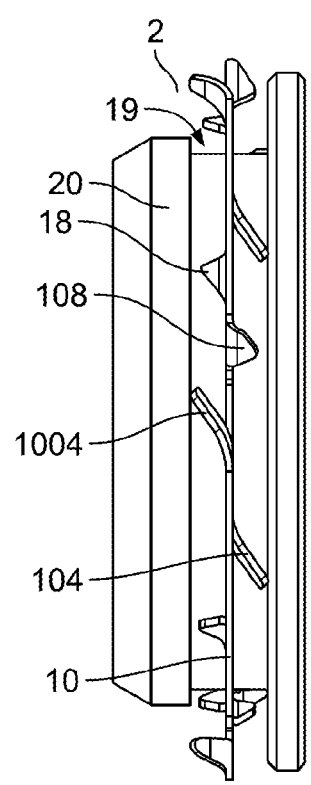
FIG. 4 is a side view of the contact ring of FIG. 2 with a contact element according to another embodiment.

FIGS. 2 to 4 show a contact ring 10 according to a first embodiment of the invention. As shown in FIG. 2, the contact ring 10 comprises a flat ring-shaped structure made of electrically conductive material having a slot 17. The contact ring 10 has projections 104, 1004 on an inwardly facing side and an outwardly facing side. The projections 104, 1004 are bent out of the ring plane, have tapered end portions, and have tips or sharp edges which penetrate the electrically insulating surface layers of the contact elements 1 and 2 and thereby establish an electrically conductive connection between the electrically conductive cores of the contact elements 1 and 2. Depending on the opposing surfaces of the contact elements 1 and 2, the projections 104, 1004 may be oriented radially (as in FIG. 1C) or tangentially (as in FIG. 2). A tangential orientation of the projections 104, 1004, in an embodiment, allows for a more efficient assembly. In an embodiment, at least one of the projections 104, 1004 is bent to form a spring contact.

As shown in FIG. 2, the contact ring 10 comprises blades 18 and 108 on the inward and outward facing sides, respectively, which are bent out of the plane of the ring 10, have tips, tapered end portions, or sharp edges, and thus penetrate into the opposing surfaces of the contact elements 1 and 2. The blades 18 and 108 are, in an embodiment but not necessarily, uniformly or evenly disposed between the projections 104 and 1004. As a result, the blades 18, 108 enable a tight press fit of the contact ring 10 and the contact elements 1 and 2 in the final arrangement state. In the embodiment shown in FIG. 2, the edges of the slot 17 form blades 18, 108.

In an embodiment, the projections 104, 1004 and the blades 18, 108 are arranged alternatingly on the inner and outer side of the contact ring 10. In another embodiment, the projections 104, 1004 and the blades 18, 108 are arranged exclusively on the inner side or exclusively on the outer side of the contact ring 10.

Compared to the projections 104 and 1004, the blades 18 and 108 are arranged at a greater angle relative to the ring plane and are therefore less deformed. While the projections 104, 1004 are mainly stressed for bending, the blades 18, 108 are mainly stressed for buckling. Therefore, the projections 104, 1004 are deformed in a controlled manner and the blades 18, 108 are deformed slightly. A ring-shaped disk 10 equipped only with the projections 104, 1004 would be elastic in the longitudinal direction. The blades 18 and 108 stiffen the contact ring 10 in the longitudinal direction, so that the projections 104 and 1004 are relieved of vibration and the contact ring 10 has a higher overall resistance to vibration. In addition, the blades 18 and 108 reduce contact resistance by providing more contact areas with higher contact normal forces. A predominantly yielding bearing of the contact ring 10 is avoided.

The material of contact ring 10, in an embodiment, is a silver-plated copper alloy. In contrast to spring steel, this material has good mechanical as well as good electrothermal properties.

The ring shape of the contact ring 10 enables, in particular, the efficient connection of cylindrical contact elements 1, 2 with a corresponding base area, since the latter has the appropriate architecture for use in a limited ring-shaped installation space. It is created in that from a disk made of an electrically conductive material, for example, a silver-plated copper alloy, a concentrical, smaller disk and an element in radial direction is removed, such that a flat ring 10 with the slot 17 is formed.

FIGS. 3A and 3B show an application example of contact ring 10. Contact ring 10 is arranged between two contact elements 1 and 2 such that it touches the oppositely disposed surfaces of contact elements 1 and 2 with the projections 14 and 1004 as well as with the blades 18 and 108. If contact elements 1 and 2 are pressed against one another, then the tips or the sharp edges of projections 14 and 1004 as well as the blades 18 and 108 penetrate electrically insulating surface layers such as a layer of aluminum oxide which naturally forms on the surface of a contact element made of electrically conductive aluminum.

An electrically conductive connection can thus be established with the aid of contact ring 10 between the electrically conductive core of first contact element 1 and the electrically conductive core of second contact element 2, even if contact elements 1 and 2 comprise insulating surfaces that electrically separate them from one another. A large number of projections 104 and 1004 as well as blades 18 and 108 on both sides of contact ring 10 has a physically positive effect on the electrothermal properties of the connection between the two contact elements 1 and 2. By using a large number of short projections 104, 1004, the contact ring 10 benefits from the advantages of multi-contact physics. The additional blades 18, 108 further increase this effect. The projections 104, 1004 each establish an electrically conductive contact, whereby a plurality of electrically conductive connections between the contact elements 1, 2 is created, which leads to many short current flows and redundant contacting.

The structure of contact ring 10 with its pointed projections 104 and 1004 as well as blades 18 and 108 for touching contact elements 1 and 2 also minimizes the area of the contact sections in which a protective surface of contact elements 1 and 2 is damaged. Corrosion of contact elements 1 and 2 can thereby be counteracted.

FIG. 4 shows a possible embodiment of the contact element 2 with a journal 20, which has a groove 19. The contact ring 10 is expandable in the radial direction through the slot 17 shown in FIG. 2 and can therefore be inserted into and held in the groove 19 on the journal 20 without the need for a special joining process. This would not be possible with a closed annular structure.

In another embodiment, the contact ring 10 can be used as part of a contact system comprising two contact elements 1, 2, where the contact ring 10 is integrated into the first contact element 1. In this case, the contacting takes place only on one side, between the second contact element 2 and the contact ring 10 integrated in the first contact element 1.

Figure 5B:
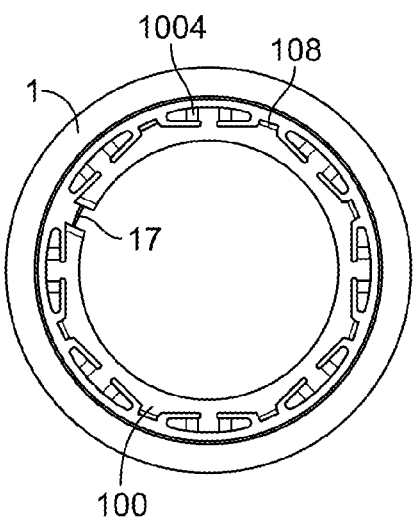
FIG. 5B is a side view of the contact ring of FIG. 5A with a contact element.
Figure 5A:
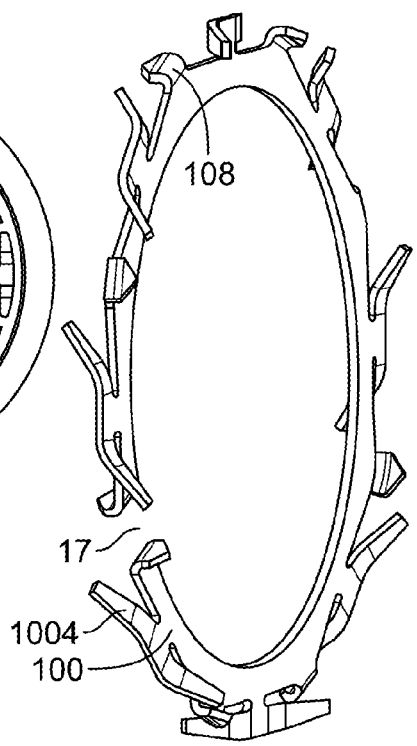
FIG. 5A is a perspective view of a contact ring according to another embodiment of the invention.
Figure 5C:
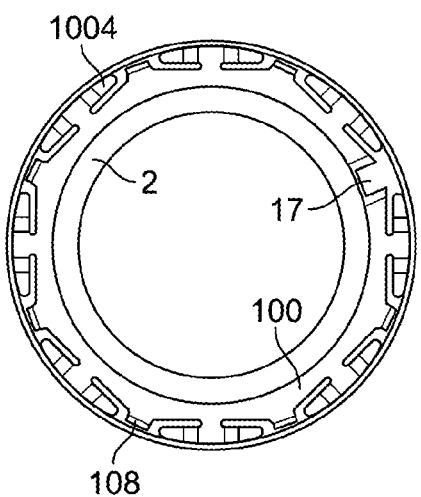
FIG. 5C is a side view of the contact ring of FIG. 5A with another contact element.

FIGS. 5A to 5C show a contact ring 100 according to a second embodiment of the present invention separately and together with contact elements 1 and 2, respectively. Like the contact ring 10 of the first embodiment, the contact ring 100 comprises a flat ring-shaped structure made of electrically conductive material with a slot 17. The contact ring 100 has projections 1004 on the outwardly facing side. The projections 1004 are bent out of the ring plane, taper, and have tips or sharp edges that penetrate the electrically insulating surface layers of the contact elements 1 and 2, thereby forming an electrically conductive connection between the electrically conductive cores of the contact elements 1 and 2. Depending on the opposing surfaces of the contact elements 1 and 2, the projections 1004 may be oriented radially (as in FIG. 1C) or tangentially (as in FIGS. 5A to 5C). A tangential orientation of the projections 1004 allows for a more efficient structure in an embodiment.

As shown in FIGS. 5A to 5C, the contact ring 100 includes blades 108 on the outwardly facing side which are bent out of the plane of the ring, have tips or sharp edges, and thus penetrate the opposing surfaces of the contact elements 1 and 2. The blades 108 are, in an embodiment but not necessarily, uniformly disposed between the projections 1004. As a result, the blades 108 enable a tight interference fit of the contact ring 100 and the contact elements 1 and 2 in the final arrangement state. Compared to the projections 1004, the blades 108 are disposed at a greater angle relative to the plane of the ring and are therefore less deformed. The blades 108 stiffen the contact ring 100 in the longitudinal direction, so that the projections 1004 are therefore relieved of vibration and the contact ring 100 has a higher vibration resistance overall. In addition, the blades 108 reduce contact resistance by providing more contact areas with higher contact normal forces.

The contact ring 100 according to the second embodiment differs from the contact ring 10 according to the first embodiment in that it only has projections 1004 and blades 108 on the outside and not on the inside, as shown in FIGS. 5A to 5C. Depending on the opposing surfaces of the contact elements 1 and 2, this arrangement may be reversed. Like the contact ring 10 according to the first embodiment, the material of contact ring 100 according to the second embodiment may be a silver-plated copper alloy, which has good mechanical as well as good electrothermal properties. The design of contact ring 100 permits simple and inexpensive manufacture by stamping and bending, as well as very favorable assembly.

The contact rings 10, 100 according to all embodiments have a high degree of adaptability with regard to the orientation, arrangement, number, and configurations of the projections and blades.

What is claimed is:

1. A contact ring, comprising:
a ring-shaped structure formed of an electrically conductive material, the ring-shaped structure defining a plane and having a plurality of projections on at least one side and a plurality of blades on at least one side, the blades extending at an angle greater than an angle of the projections relative to the plane, wherein the projections and the blades penetrate an electrically insulating surface layer of each of a pair of contact elements and contact an electrically conductive material of each of the contact elements to electrically connect the contact elements.

2. The contact ring of claim 1, wherein the ring-shaped structure is arranged in a flat manner.

3. The contact ring of claim 1, wherein the ring-shaped structure has a slot in a radial direction.

4. The contact ring of claim 1, wherein each of the projections has a tapering end section connected to one of the contact elements.

5. The contact ring of claim 1, wherein at least one of the projections is bent to form a spring contact.

6. The contact ring of claim 1, wherein each of the blades has a tapered end portion connected to one of the contact elements.

7. The contact ring of claim 1, wherein a portion of each of the blades is bent.

8. The contact ring of claim 1, wherein the electrically conductive material is a silver-plated copper alloy.

9. The contact ring of claim 1, wherein the projections include a first plurality of projections on an inner side of the ring-shaped structure and a second plurality of projections on an outer side of the ring-shaped structure.

10. The contact ring of claim 9, wherein the first plurality of projections and the second plurality of projections are bent out of a plane of the ring-shaped structure in opposite directions.

11. The contact ring of claim 1, wherein the blades include a first plurality of blades on an inner side of the ring-shaped structure and a second plurality of blades on an outer side of the ring-shaped structure.

12. The contact ring of claim 11, wherein the first plurality of blades and the second plurality of blades are bent out of a plane of the ring-shaped structure in opposite directions.

13. The contact ring of claim 1, wherein the ring-shaped structure has five projections and six blades on each of an inner side and an outer side.

14. The contact ring of claim 1, wherein only one of an outer side and an inner side of the ring-shaped structure has the projections and the blades.

15. The contact ring of claim 14, wherein the ring-shaped structure has a slot in a radial direction, a pair of edges of the slot form a pair of blades bent out of a plane of the ring-shaped structure in opposite directions.

16. The contact ring of claim 14, wherein the ring-shaped structure has sixteen projections and nine blades on one of the outer side and the inner side.

17. A contact system, comprising:
a first contact element formed of an electrically conductive material with an electrically insulating surface layer;
a second contact element formed of the electrically conductive material with the electrically insulating surface layer; and
a contact ring including a ring-shaped structure having a plurality of projections on at least one side and a plurality of blades on at least one side, the blades extending at an angle greater than an angle of the projections relative to the planar surface, wherein the projections and the blades penetrate the electrically insulating surface layer of each of the contact elements and contact the electrically conductive material of each of the contact elements to electrically connect the contact elements, whereby the blades stiffen the contact system so that the projections exhibit less vibration and the contact system has a higher vibration resistance overall.

18. The contact system of claim 17, wherein the contact ring is integrated into one of the first contact element and the second contact element.

19. A contact ring, comprising:
a ring-shaped structure formed of an electrically conductive material, the ring-shaped structure having a plurality of projections on at least one side and a plurality of blades on at least one side, the projections and the blades penetrate an electrically insulating surface layer of each of a pair of contact elements and contact an electrically conductive material of each of the contact elements to electrically connect the contact elements, wherein only one of an outer side and an inner side of the ring-shaped structure has the projections and the blades, and the ring-shaped structure further comprise a slot in a radial direction, wherein a pair of edges of the slot form a pair of blades bent out of a plane of the ring-shaped structure in opposite directions.

* * * * *